United States Patent [19]
Wirth et al.

[11] Patent Number: 5,755,025
[45] Date of Patent: May 26, 1998

[54] PROCESS FOR MANUFACTURING CATALYTIC CONVERTERS, ESPECIALLY BODIES OF MOTOR VEHICLE CATALYTIC CONVERTERS OF MODULAR DESIGN

[75] Inventors: Georg Wirth, Kirchheim; Siegfried Wörner, Esslingen; Klaus Hoffmann, Ottweiler, all of Germany

[73] Assignee: J. Eberspächer GmbH & Co., Esslingen, Germany

[21] Appl. No.: 532,417

[22] Filed: Sep. 22, 1995

[30] Foreign Application Priority Data

Sep. 23, 1994 [DE] Germany .............. 44 33 974.7

[51] Int. Cl.[6] .................................................. B23P 15/00
[52] U.S. Cl. ........................................... 29/890; 29/520
[58] Field of Search ................... 29/890, 445, 455.1, 29/520, 525

[56] References Cited

U.S. PATENT DOCUMENTS 4,102,652  7/1978  Voge ............................................ 29/890
4,148,120  4/1979  Siebels ......................................... 29/890
4,750,251  6/1988  Motley et al. .
5,557,847  9/1996  Koshiba et al. ............................. 29/890

OTHER PUBLICATIONS

Nov. 19, 1992 Manufacture of Cylindrical Honeycomb Structure Patent Abstracts of Japan, vol. 017, No. 172.

Primary Examiner—Irene Cuda

[57] ABSTRACT

A process for preparing catalytic converters, especially bodies of motor vehicle catalytic converters of modular design, by pushing monoliths and a surrounding support jacket into prefabricated tubes, whose cross section essentially corresponds to the profile of the monolith plus an addition for the support jacket. The dimensions of the tube (housing) are adapted to a constant gap (s) from the monolith by sizing (calibrating) the prefabricated tubes which initially have a smaller cross section.

20 Claims, 5 Drawing Sheets

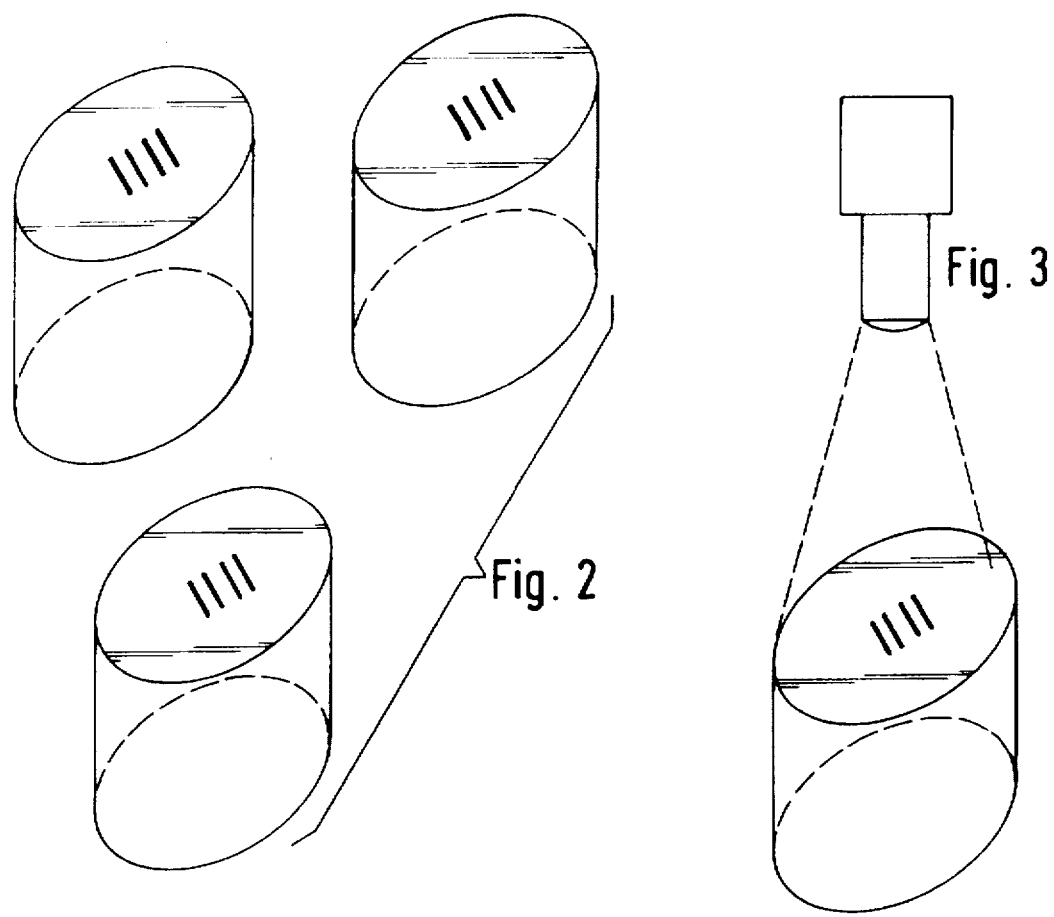
Fig. 2
Fig. 3
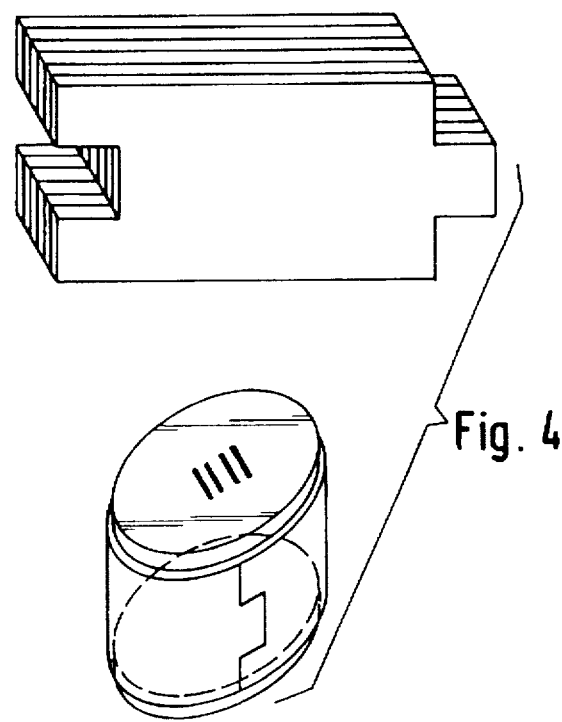
Fig. 4

PROCESS FOR MANUFACTURING CATALYTIC CONVERTERS, ESPECIALLY BODIES OF MOTOR VEHICLE CATALYTIC CONVERTERS OF MODULAR DESIGN

FIELD OF THE INVENTION

The present invention pertains to a process for manufacturing catalytic converters, especially bodies of motor vehicle catalytic converters of modular design, by pushing monoliths and the surrounding support jacket into prefabricated tubes, the tube having a cross section which is essentially the profile of the monolith plus an additional portion for the support jacket.

BACKGROUND OF THE INVENTION

It was found that the embedding of highly sensitive monoliths with a surrounding swelling mat in prefabricated tubes is problematic for an optimal snug-fit seating during operation of the catalytic converter. This is due to prefabricated monoliths, which may inherently have deviations in shape and dimensions, just as the prefabricated tubes which may have deviations in shape and dimensions as well. Thus, an excessively tight, but also an excessively loose seating of the monolith with the swelling mat may occur in the tubular housing during the operation of a catalytic converter in the case of greater manufacturing tolerances. Both are undesirable. An excessively tight seating may lead to rupture of the highly sensitive monolith during assembly or in the case of impacts on the part (attachment to the vehicle), especially if it is a thin-walled part made of ceramic. An excessively loose seating is equivalent to poor support, and it leads, among other things, to a displacement and shattering of the monolith during the loads occurring during operation (vibrations, pulsation of the exhaust gas) in the steel jacket, as well as to an excessive, unacceptable solid-borne noise behavior (impact of the loose body against metal).

SUMMARY AND OBJECTS OF THE INVENTION

The object of the present invention is to provide a catalytic converter manufacturing process of the type described above, which makes possible an optimal snug fit of one or more monoliths in a protective tube by simple means.

According to the invention, a process for manufacturing catalytic converters is provided particularly catalytic converters for motor vehicle exhaust systems wherein the catalytic converter is of a modular design. The process includes pushing the monoliths and a surrounding support jacket into the prefabricated tubes. The prefabricated tubes initially have a cross section which is smaller than the size of the profile of the monolithic plus an additional portion for the support jacket. The dimensions of the tube (housing) are adapted to a constant gap from the monoliths by calibrating the prefabricated tubes, the tubes initially having a smaller cross section.

The process according to the invention further includes measuring individual monoliths as part of a quality assurance procedure at the time of manufacture and adapting dimensional information to form the dimensions of the tube housing. The dimensions of the monoliths are properly applied to the individual monoliths at a visible and/or recordable individual code during the quality assurance procedure. The individual code is preferably applied to an unrecorded outer circumstantial surface of the monolith. The individual code may be milled onto a front side intake or applied to the circumference of the monoliths body. The code is preferably markedly deeper than a thickness of the coating. The individual code may also be stamped on or burned in with a laser as a bar code or as a freely selectable code.

The invention further provides that the code on the monolith is read automatically. The individual code is automatically sent to a sizing press and is processed at the sizing press. The calibration (sizing via a sizing press) of the tubes is preferably performed by adjustable calibrating mandrels. The calibration of the tubes may also be performed with fixed calibrating mandrels and the dimension of the monolith is classified based on three size classes for this purpose. The corresponding calibrating mandrels, based on the size classes, are placed into the sizing press. A deviation in the shape of the monolith may be adjusted by a corresponding asymmetrical calibration on the tube (housing).

The support jacket is preferably a swelling mat. The support that may be wire mesh. The support jacket may also be a ceramic fiber mat. The support jacket may also be formed of a quartz glass fiber mat.

The dimensions of the tube (housing) are adapted according to the present invention to a predetermined exact, i.e., constant gap from the monolith by calibrating (sizing to fit) the prefabricated tubes, whose cross section is initially smaller than the monolith size plus the gap size.

The dimensions of the monolith are needed for adapting the dimensions of the tubular housing in order to make it possible to define a constant gap. These dimensions can be obtained by new measurement of the prefabricated monoliths or by transfer of the dimensions of the monoliths from the quality assurance performed during the basic manufacture of the monoliths, at which time up to 100% of the individual parts are measured, anyway.

The dimensions of the monoliths are stored unmistakably and securely if, according to an advantageous variant of the present invention, they are applied to the appropriate area on the individual monolith as a visible or at least recordable individual code at the time of the quality assurance in the basic manufacture.

The individual code may be applied to an uncoated outer circumferential surface of the monolith.

However, the individual code may also be milled on the front-side intake or the (subsequently coated) circumference of the monolith body, in which case the code is markedly deeper than the thickness of the coating (wash coat, precious metal), so that the code can also be recognized after the coating.

According to an advantageous variant of the present invention, the individual code is stamped on or burned in with a laser as a bar code or as a freely selectable code.

It is especially appropriate for the individual code to be read automatically, e.g., via a bar code reader or a video image processing unit, and especially for it to be automatically entered into and processed in a sizing press, for which especially adjustable calibrating mandrels, which set the calibration dimension of the prefabricated tubes, are used.

As an alternative, it is also possible to use fixed calibrating mandrels, by which the tubes are calibrated. The dimensions of the monolith are classified for this purpose especially to three size classes, and the corresponding calibrating mandrels are placed into the sizing press before the expansion of the tubes is begun.

An especially suitable variant of the tube adaptation process according to the present invention is characterized in

3 that a deviation in the shape of the monolith (especially outside a predetermined manufacturing tolerance) is not a reason for a reject, but it is adjusted by corresponding asymmetric calibration on the tubular housing. Consequently, errors in the manufacture of the monolith are eliminated in that the calibrated tube will then have the same "error," i.e., the circumferential gap existing between the tube and the monolith continues to have a constant width.

Consequently, inaccuracies in the prefabrication of the monolith, of the tube, as well as of the support jacket arranged between them, which is preferably a swelling mat, but may also be a wire mesh, are compensated, in principle, with amazingly simple means. It is especially advantageous that the support point and the pressing of the monolith by the swelling mass are individually coordinated with one another in a modular catalytic converter, as a result of which special conditions of use and desires of the user can be accommodated. It is also possible to install swelling mats of different thickness even in the case of monoliths with great deviations in dimensions and shape, which is associated with cost advantages in manufacture.

It is also advantageous that variations in the gap and consequently in pressing on the circumference can be reduced, as a result of which the use of monoliths with smaller compressive strength reserves (thin-walled products made of ceramic) is made possible as well.

The present invention makes it possible, in principle, to set uniform gaps more easily than on half-shell or wound catalytic converters, because the friction between the monolith, the swelling mat and the tubular housing does not oppose centering (the direction of centering and the direction of the force during the assembly are at right angles to one another).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a detailed view of FIG. 1A, namely, coded monoliths.

4

Figure 1A:
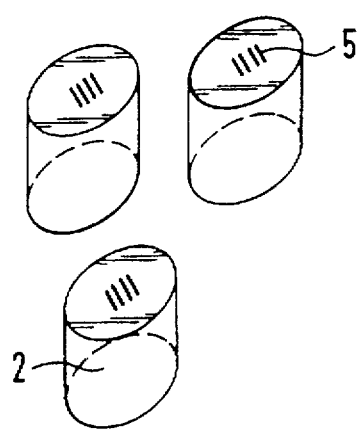
FIG. 1a is a general perspective view for explaining a manufacturing process step according to the present invention.
Figure 1B:
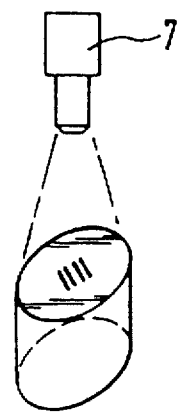
FIG. 1b is a general perspective view for explaining a further manufacturing process step according to the invention.
Figure 1C:
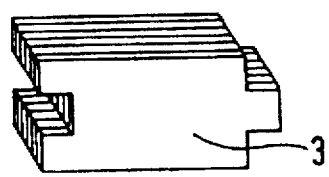
FIG. 1c is a general perspective view for explaining a further manufacturing process step according to the invention.
Figure 1D:
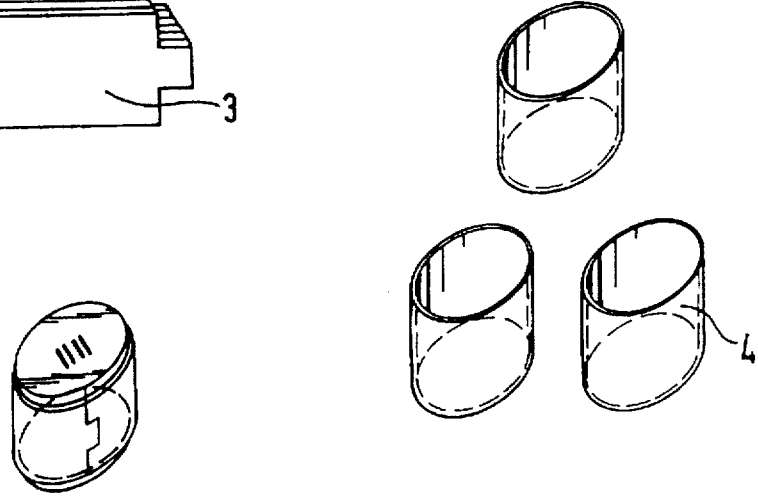
FIG. 1d is a general perspective view for explaining a further manufacturing process step according to the invention.
Figure 1E:
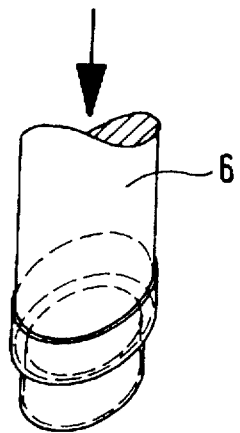
FIG. 1e is a general perspective view for explaining a further manufacturing process step according to the invention.
Figure 1F:
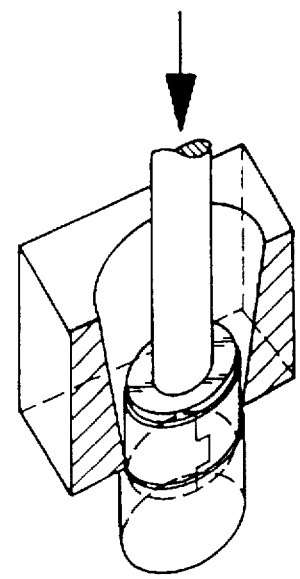
FIG. 1f is a general perspective view for explaining a further manufacturing process step according to the invention.
Figure 1G:
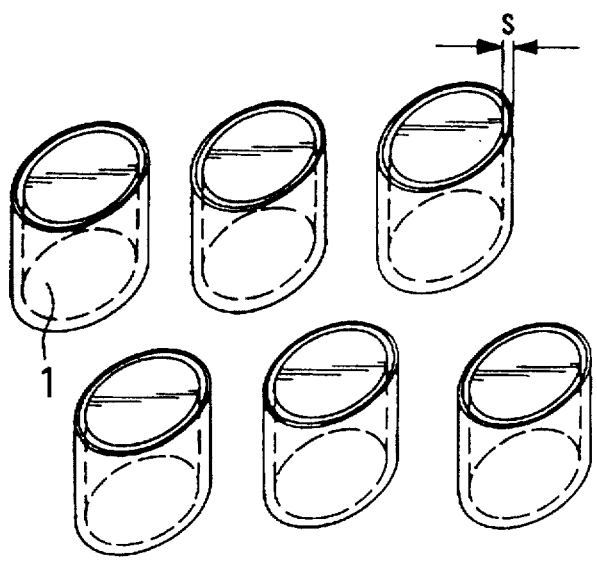
FIG. 1g is a general perspective view for explaining a further manufacturing process step according to the invention.
Figure 5:
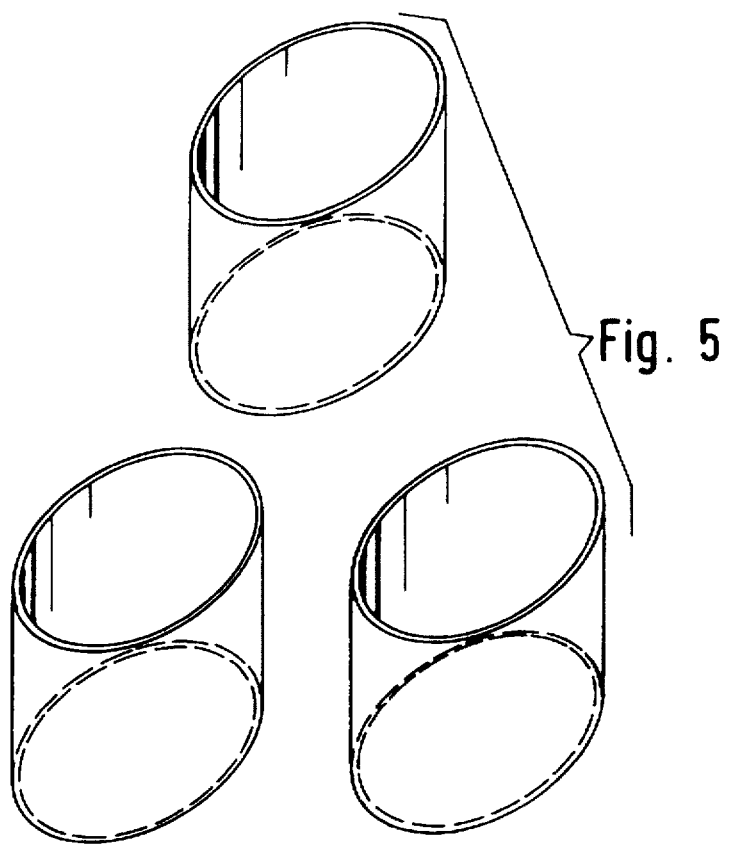
Figure 6:
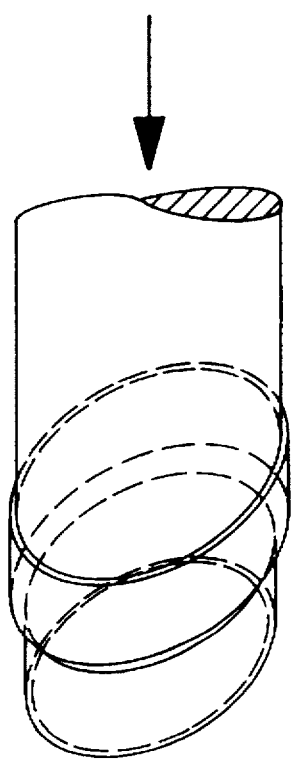
Figure 7:
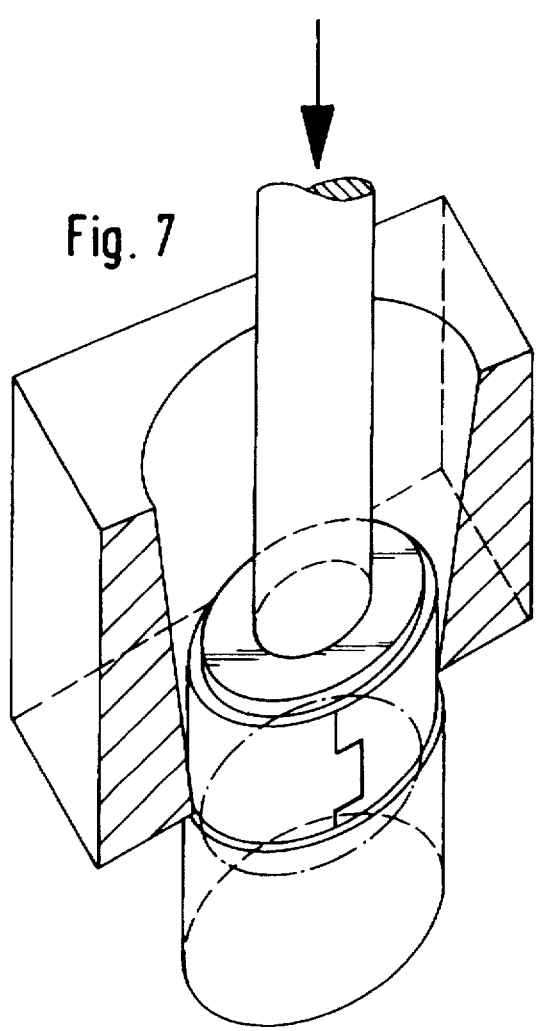
Figure 8:
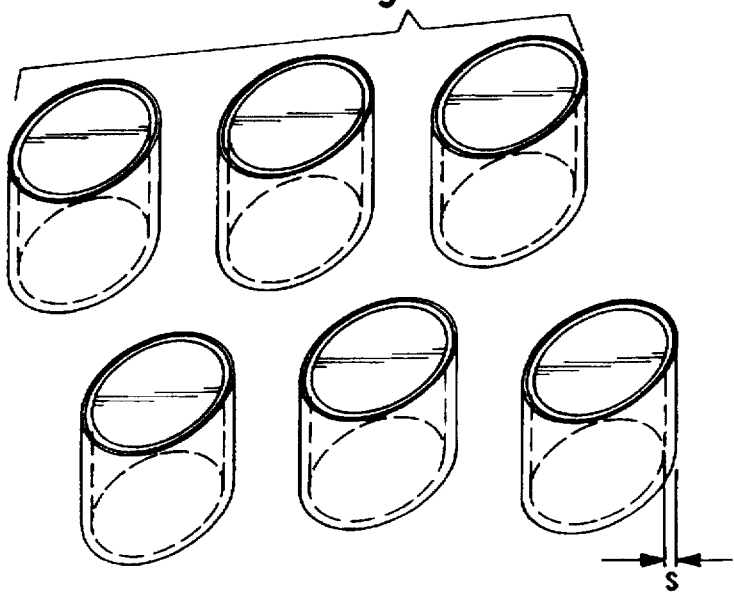

FIG. 3 is a detailed view of FIG. 1B, namely, the reading of the individual code;

FIG. 4 is a detailed view of FIG. 1C, namely, the assembly of the swelling mat;

FIG. 5 is a detailed view of FIG. 1D, namely, modular tubes with a dimension smaller than specified;

FIG. 6 is a detailed view of FIG. 1E, namely, the calibration of the tube corresponding to the monolith dimension read and the specified gap;

FIG. 7 is a detailed view of FIG. 1F, namely, the pushing of the monolith with the swelling mat into the calibrated tubular housing; and FIG. 8 is a detailed view of FIG. 1G, namely, finished modular tubes.

DETAILED DESCRIPTION OF THE PREFERRED EMBODIMENT

The parts shown in the drawing pertain to a body 1 of a motor vehicle catalytic converter of modular design. The modular catalytic converter is of no particular interest here. A body 1 has a housing in the form of a straight tube, which has an oval cross section in the exemplary embodiment shown in the drawing. The body 1 is a catalytic converter module, which is joined by additional catalytic converter modules of different design at the axial ends to form the modular catalytic converter.

The body 1 comprises a monolith 2 of cylindrical shape, in which an individual code 5 is applied. The code 5 is stamped or milled, on the upper front side according to FIG. 1.

The individual code 5 includes the dimensions of the monolith 2, data on the shape of the monolith, deviations in the shape of the monolith, or other characteristic variables, which are peculiar exclusively to this monolith 2. The individual code 5, i.e., a bar code, is arranged visibly or at least in such a manner that it is able to be recorded or scanned by an automatic reading means. This reading means is, e.g., a bar code reader. The code can still be recognized even after coating of the monolith (wash coat and precious metal).

The individual code 5 is determined already at the time of the prefabrication within the framework of the final inspection for quality assurance of the semifinished parts, and it is unmistakably associated with same.

Not only the monolith 2, but also the housing of tubular shape is prefabricated, namely, in the form of a tube 4 with a dimension smaller than specified, as can be determined from FIG. 5. Consequently, in the prefabicated state of the semifinished part, the tube 4 has a diameter which is smaller than the diameter of the monolith plus an additional portion for a swelling mat 3, which is laid around the circumference of the monolith 5 according to FIG. 4 and is secured, e.g., with an adhesive tape.

For the final assembly of a tubular module according to FIG. 8, the individual code 5 is read by an automatic reader 7 according to FIG. 3, and it is entered into a sizing press, or the sizing press is set by an operator corresponding to the data of the monolith. The operator selects, e.g., the fixed calibrating mandrels 6 which correspond to the data of the monolith (with additional portion provided for) and makes it possible to size to fit (calibrate) a prefabricated tube 4 according to FIG. 6, so that a constant distance or gap, which will be occupied by the swelling mat 3, is formed on the entire surface of the finished module according to FIG. 8.

As noted above, the precalibrated tubes, or tube s in their initial state, have an initial dimension which is initially smaller than the monolith size plus the gap size. Accordingly, as shown in FIG. 6, the prefabricated tubes 4 are sized during a calibration step wherein the calibrating mandril 6 expands the internal dimension (between internal surfaces) of the prefabricated tubes 4 to form the calibrated tubes.

Consequently, the prefabricated tubes 4 are sized to fit (calibrated) corresponding to the dimension of the monolith read and the specified gap using a sizing press, according to FIG. 6. The monolith 2 according to FIG. 7, wrapped with the swelling mat 3, is then pushed into the calibrated tube in the sizing press.

Thus, tubular modules according to FIG. 8, which have exactly the desired gap s, are formed according to the manufacturing process described.

The above manufacturing process describes the present invention in general terms.

Additional variants are obtained, e.g., in the case of the manufacture of a multi-bed catalytic converter by wrapping a plurality of axially directed monoliths 2, arranged at spaced locations from one another, with a single swelling mat 3, pushing the monoliths into a single calibrated tube from an axial side, wherein the front-side axial distance between the monoliths is fitted with wire mesh, sheet-metal rings, or ceramic rings.

It is also possible to press in monoliths with swelling mat wrapped around them from both axial sides of a calibrated tube.

While a specific embodiment of the invention has been shown and described in detail to illustrate the application of the principles of the invention, it will be understood that the invention may be embodied otherwise without departing from such principles.

What is claimed is:

1. A process for manufacturing catalytic converters, particularly motor vehicle catalytic converters of modular design, comprising the steps of:
   providing a monolith;
   determining dimensions of said monolith to provide a monolith of determined dimensions;
   providing prefabricated tubes having a cross section which is smaller than a cross-sectional dimension of said monolith plus a constant gap;
   sizing the prefabricated tubes by expanding an internal dimension of a tube to calibrate said tube to provide a calibrated tube with cross-sectional dimension equal to said monolith of determined dimensions plus and constant gap;
   subsequent to said step of sizing, pushing said monolith of determined dimensions and a surrounding support jacket into said calibrated tube.

2. A process according to claim 1, further comprising:
   again measuring said monolith of determined dimensions for adaptation to dimensions of the tube.

3. A process according to claim 1, wherein said step of determining the size of the monolith occurs during a quality assurance process during manufacture of the monolith, the dimensions being determined during a measuring step.

4. A process according to claim 2, wherein said dimensions of said monolith are applied as coded data as a visible and/or recordable individual code.

5. A process according to claim 4, wherein said individual code is applied to an uncoded outer circumferential surface of said monolith of determined dimensions.

6. A process according to claim 4, wherein said individual code is milled onto a front side intake or to a circumferential surface of a body of said monolith of determined dimensions, said code being markedly deeper than a thickness of a a coating of said monolith of determined dimensions, said coating being one of a wash coating and a precious metal coating.

7. A process according to claim 4, wherein said individual code is stamped on or burned in with a laser as a bar code or a freely-selectable code.

8. A process according to claim 4, wherein said individual code is read automatically during a reading step prior to said step of sizing.

9. A process according to claim 4, wherein said individual code is automatically sent to a sizing press and is processed at said sizing press for sizing said prefabricated tubes.

10. A process according to claim 1, wherein said step of sizing said tubes includes using adjustable calibrating mandrills.

11. A process according to claim 1, wherein said step of sizing said tubes includes using fixed calibrating mandrills and classifying dimensions of said monoliths to one of three size classes, said calibrating mandrills being provided corresponding to said size classes, said sizing including placing a corresponding size class mandrill into a sizing press.

12. A process according to claim 1, wherein a deviation in shape of said monolith is adjusted by a corresponding asymmetric sizing step formed on the prefabricated tube.

13. A process according to claim 1, wherein said support jacket is a swelling mat.

14. A process according to claim 1, wherein said support jacket is a wire mesh structure.

15. A process according to claim 1, wherein said support jacket is a ceramic fiber mat.

16. A process according to claim 1, wherein said support jacket is formed of a quartz glass fiber mat.

17. A process for manufacturing catalytic converters, particularly motor vehicle catalytic converters of modular design, comprising the steps of:
   providing a monolith;
   determining dimensions of said monolith to provide a monolith of determined dimensions;
   providing a prefabricated tube having an internal dimension which is smaller than an outer dimension of said monolith plus a constant gap;
   sizing the prefabricated tube by expanding said internal dimension to calibrate the tube to provide a calibrated tube with a cross-sectional dimension equal to said monolith of determined dimensions plus said constant gap;
   pushing said monolith of determined dimensions and a surrounding support jacket into said calibrated tube, after said step of sizing.

18. A process according to claim 1, wherein said step of determining the dimensions of the monolith occurs during a measuring step, and information as to said dimensions are applied to said monolith as coded data and said individual code is automatically sent to a sizing press and is processed at said sizing press for sizing said prefabricated tubes.

19. A process according to claim 18, wherein said step of sizing said tubes includes using adjustable calibrating mandrills.

20. A process according to claim 18, wherein said step of sizing said tubes includes using fixed calibrating mandrills and classifying dimensions of said monoliths to one of three size classes, said calibrating mandrills being provided corresponding to said size classes, said sizing including placing a corresponding size class mandril into a sizing press.

* * * * *